United States Patent
Gage et al.

[11] Patent Number: 6,069,341
[45] Date of Patent: May 30, 2000

[54] BRUSH BLOCK HOUSING FOR PROPELLER DEICING SYSTEM

[75] Inventors: Marc E. Gage, Feeding Hills, Mass.; Robert W. Pruden, Enfield, Conn.

[73] Assignee: United Technologies Corporation, Windsor Locks, Conn.

[21] Appl. No.: 09/087,308

[22] Filed: May 29, 1998

[51] Int. Cl.[7] .................................................. H05B 1/00
[52] U.S. Cl. ........................ 219/201; 219/202; 310/239; 244/134
[58] Field of Search ................................ 219/200, 201, 219/531, 541; 244/134, 134 D; 310/90, 178, 239, 242, 247

[56] References Cited

U.S. PATENT DOCUMENTS

| | | | |
|---|---|---|---|
| 3,387,155 | 6/1968 | Krulls | 310/239 |
| 3,644,703 | 2/1972 | Nelson | 219/201 |
| 3,657,514 | 4/1972 | Adams | 219/201 |
| 4,386,749 | 6/1983 | Sweet et al. | 244/134 D |
| 4,686,405 | 8/1987 | McKee | 310/178 |
| 4,746,828 | 5/1988 | Nado et al. | 310/90 |
| 5,509,625 | 4/1996 | Oulette et al. | 244/134 |
| 5,767,605 | 6/1998 | Giamati | 310/239 |
| 5,949,175 | 9/1999 | Cummins | 310/239 |

*Primary Examiner*—Philip H. Leung
*Assistant Examiner*—Leonid Fastovsky
*Attorney, Agent, or Firm*—Dominic J. Chiantera; Moore & Van Allen, PLLC

[57] ABSTRACT

The brush block housing for providing stationary mounting of graphite composition brushes in contact registration with the rotating interface slip rings of an aircraft propeller deicing system, is formed from a thermoplastic molding compound comprising an organic polytetrafluoroethylene (PTFE) filler distributed within a polyetheretherketone (PEEK) thermoplastic resin, thereby minimizing non-functional abrasion of the brushes.

10 Claims, 5 Drawing Sheets

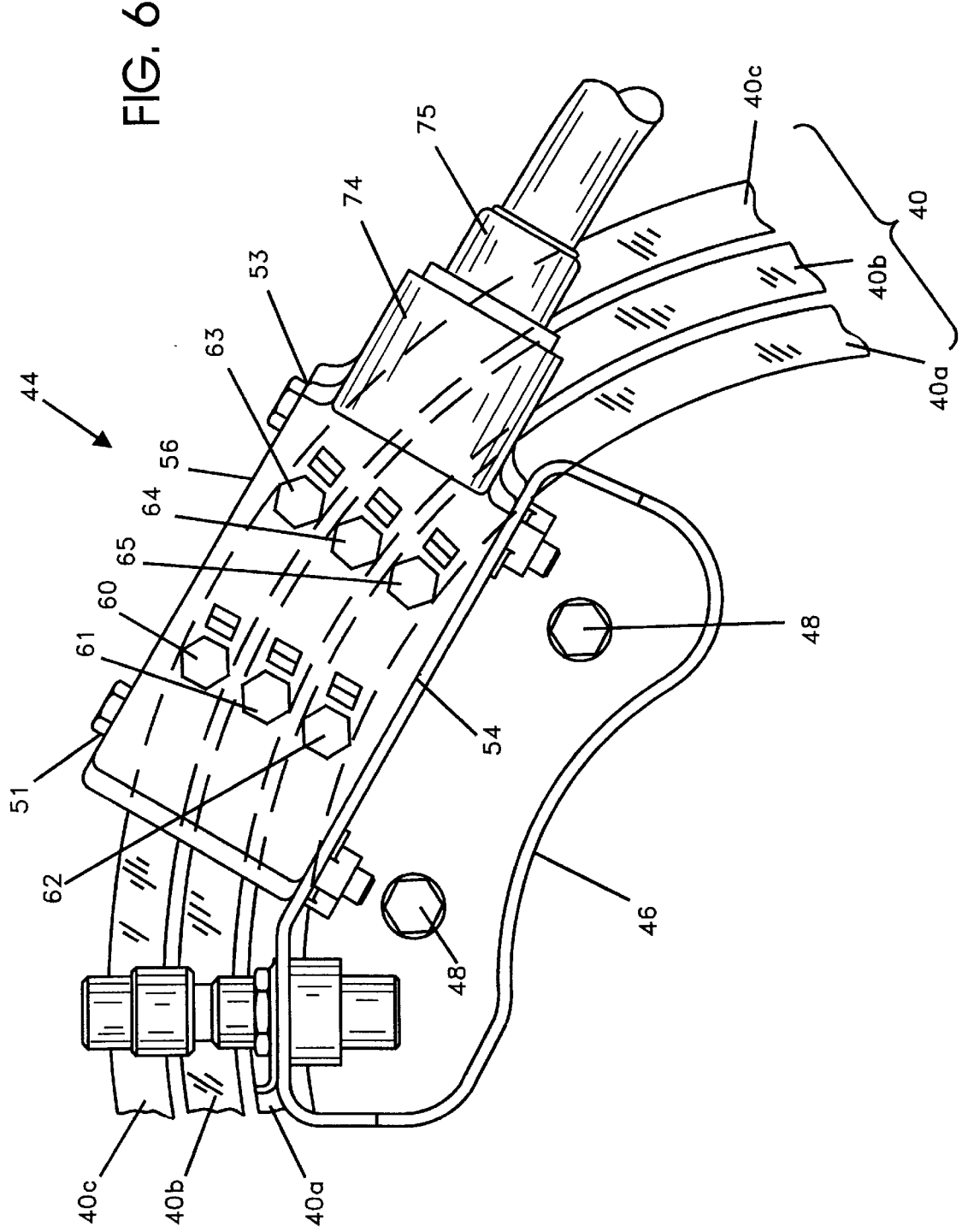

BRUSH BLOCK HOUSING FOR PROPELLER DEICING SYSTEM

CROSS REFERENCE TO RELATED APPLICATIONS

Some of the information disclosed in this application is also disclosed and claimed in a commonly owned, co-pending application entitled: Multiple Piece Propeller Deicing System Brush Block Housing, Ser. No. 09/087,076 filed on even date herewith by Robert W. Pruden et al.

DESCRIPTION

1. Technical Field

This invention relates to aircraft propeller deicing systems, and more particularly to brush block assemblies for use in propeller deicing systems.

2. Background Art

As known, propeller deicing systems are used to prevent ice build-up on the airfoil surfaces of an aircraft's propeller blades. The most common type deicing system uses resistive heating elements in the form of flexible strips which are disposed, typically bonded by adhesive, along a section of the blade's leading edge closest to the hub assembly. The application of electrical current to the heaters weakens the bond between accumulated ice and the airfoil surface allowing the ice to be "thrown off" by the centrifugal forces generated by rotation of the propeller.

An aircraft power source located on the non-rotating side of the propeller-engine interface provides electrical current to the heaters through a rotating interface comprising stationary, electrically conductive brushes which are in electrical contact with associated ones of a plurality of electrically conductive slip rings mounted to the rear of the rotating propeller's spinner assembly. The brushes, typically a graphite composition, are each mounted in individual brush pockets, i.e. the chamber which houses the brush, which are formed within a brush block housing assembly. The pockets spatially position the brushes in a manner which provides mechanical contact between a first contact end of the brush body's longitudinal axis and the associated slip ring surface. Each of the brushes are spring loaded to force the contact end into mechanical and, therefore, electrical contact with the slip ring surface. The distal, or opposite end of each brush is electrically connected to the power source.

Since the brushes are electrically conductive the brush pockets must electrically insulate the brush body from other conductive elements to prevent current leakage or shorting of the power source. This is accomplished by fabricating the pockets and the brush block housing itself from an insulating material. The prior art materials used are typically thermosetting compounds, such as diallylphthalate (DAP) epoxy, which are injection molded into a die molding of the housing. These thermosetting compounds typically have an inorganic filler, such as glass fiber, which is distributed within them and which provides good electrical insulating qualities. The glass filler, however, is abrasive to the brush graphite composition. Since the brush pocket dimensions are held to a tight tolerance to provide suitable mechanical support to the brush body, there is contact between the surfaces of the brush body and the pocket walls.

Due to the frictional forces of the rotating slip ring surface and the graphite composition nature of the brushes, the contact end of the brushes wear down with use. This is an acceptable characteristic of the rotating interface in which the brushes are designed to be a consumable element of the deicing system. Ideally the brush wear would occur exclusively on the contact end surface and brush life would be a function of brush length. However, the glass filler contained within the pocket wall material prior art brush block housings abrades the brush body whenever there is brush motion within the pocket, creating non-functional wear of the brush separate from erosion of the contact surface.

This non-functional wear results from tolerances in the slip ring and/or the hub assembly which produce a degree of undulation of the slip ring surface that cyclically forces the brush back into the pocket. The cyclic displacement is opposed by the spring force causing the brush to reciprocate within the pocket at the operating RPM of the propeller shaft. The reciprocal motion coupled with the side loading caused by the surface friction and the direction of rotation of the slip ring, abrades the side loaded surface of the brush along its length as it runs across the glass impregnated wall surface of the pocket. This produces a carbon powder residue which mixes with surface oil from the engine (the brush housing assembly is mounted to the engine gearbox) to create a sludge within the pocket.

The effect of a sludge build-up in the pocket is to limit free motion of the brush within the pocket thereby reducing the effectiveness of the spring load. In the worst case the sludge can tighten the brush within the pocket to the extent that the spring force can no longer force the contact end onto the surface of the slip ring, thereby preventing current flow across the surface. More typically the cyclic displacement and the sludge build-up produce periodic gaps between the contact end and the slip ring surface resulting in electrical arcing. Arcing produces rapid deterioration of the housing pockets, the brush contact end surface, and the slip ring surface. The erosion of the pocket wall creates unwanted brush mobility, resulting in further abrasion and wear, further sludge build-up, and further arcing. The result is premature brush and housing replacement. The overall effect being higher maintenance costs.

DISCLOSURE OF INVENTION

One object of the present invention is to provide an improved brush pocket structure to minimize non-functional abrasion of the brushes, thereby extending the functional brush life. Another object of the present invention is to provide a new brush housing assembly which improves brush functional performance and extends the useful life of the housing.

According to the present invention, a brush block housing is formed from a thermoplastic molding compound comprising an organic polytetrafluoroethylene (PTFE) filler distributed within a polyetheretherketone (PEEK) thermoplastic resin. In further accord with the present invention, the PTFE is contained within the molding compound at a level of from 5% to 50% by weight. In still further accord with the present invention, the preferred range of composition of the PTFE within the molding compound is from 15% to 40% by weight. In still yet further accord with the present invention, the molding compound comprises Ensinger Special Polymers compound XP-93 (30% PTFE filled PEEK). In still yet further accord with the present invention, the molding compound comprises LNP Engineering Plastics compound LL-4040 (20% PTFE filled PEEK).

The present brush block housing material was selected for its combination of good electrical insulating capability and good mechanical wear characteristics. The PEEK compound has naturally good wear characteristics while PTFE (commonly referred to as TEFLON, a registered trademark of the Dupont Corporation) provides additional lubrication to any wear surfaces that may occur within the brush pocket, thereby minimizing further erosion. Further desirable characteristics of the PTFE filled PEEK molding compound are good chemical resistance, temperature resistance, and strength.

These and other objects, features, and advantages of the present invention will become more apparent in light of the following detailed description of a best mode embodiment thereof, as illustrated in the accompanying Drawing.

BRIEF DESCRIPTION OF DRAWING

FIG. 6 is a figurative illustration of the brush block assembly of FIGS. 3, 5 as installed in the propeller assembly of FIG. 1.

BEST MODE FOR CARRYING OUT THE INVENTION

Figure 1:
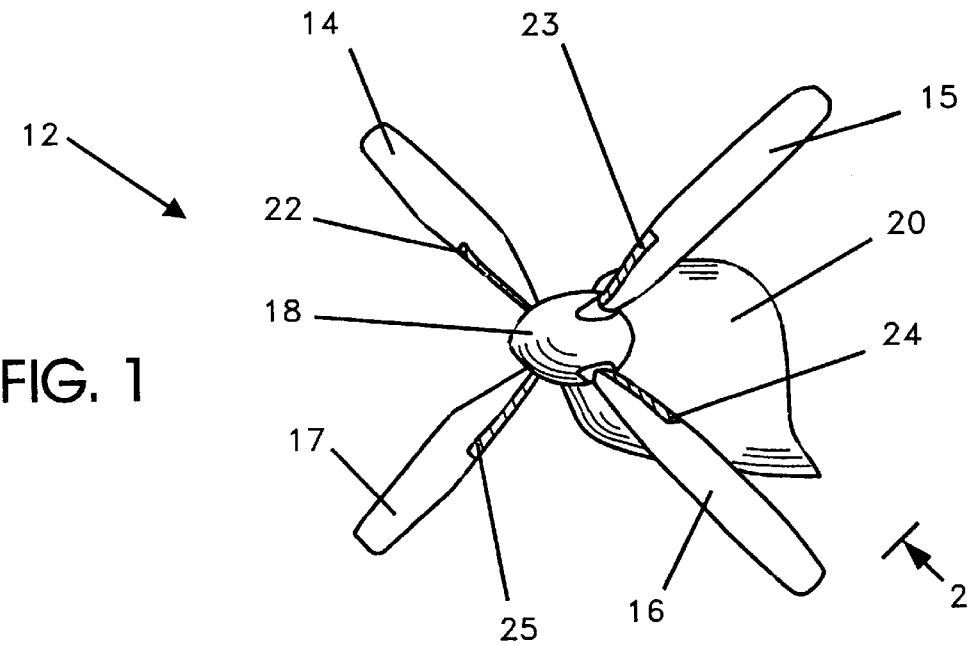
FIG. 1 is a perspective illustration of a propeller assembly in which the present invention may be used.

The best mode embodiment of the invention is described with respect to a four blade propeller assembly 12, as shown in FIG. 1. It should be understood, however, that the present invention may be used with any multi-bladed propeller assembly, with the number of the propeller blades determining the number of brushes used, as will become evident with the following detailed description.

The illustrated propeller assembly of FIG. 1 includes four propeller blades 14 17 which are radially spaced 90° on center on a spinner assembly 18. The assembly is mounted to an engine (not shown) having an engine cowling 20. The blades 14–17 are typically a composite material, and include heating elements 22–25 disposed on the leading edges of the blades 14–17. In the present embodiment, the heating elements are resistive element heaters of a known type. It should be understood, however, that the heater elements may be of any known type deemed suitable by those skilled in the art for a particular propeller assembly application.

Figure 2:
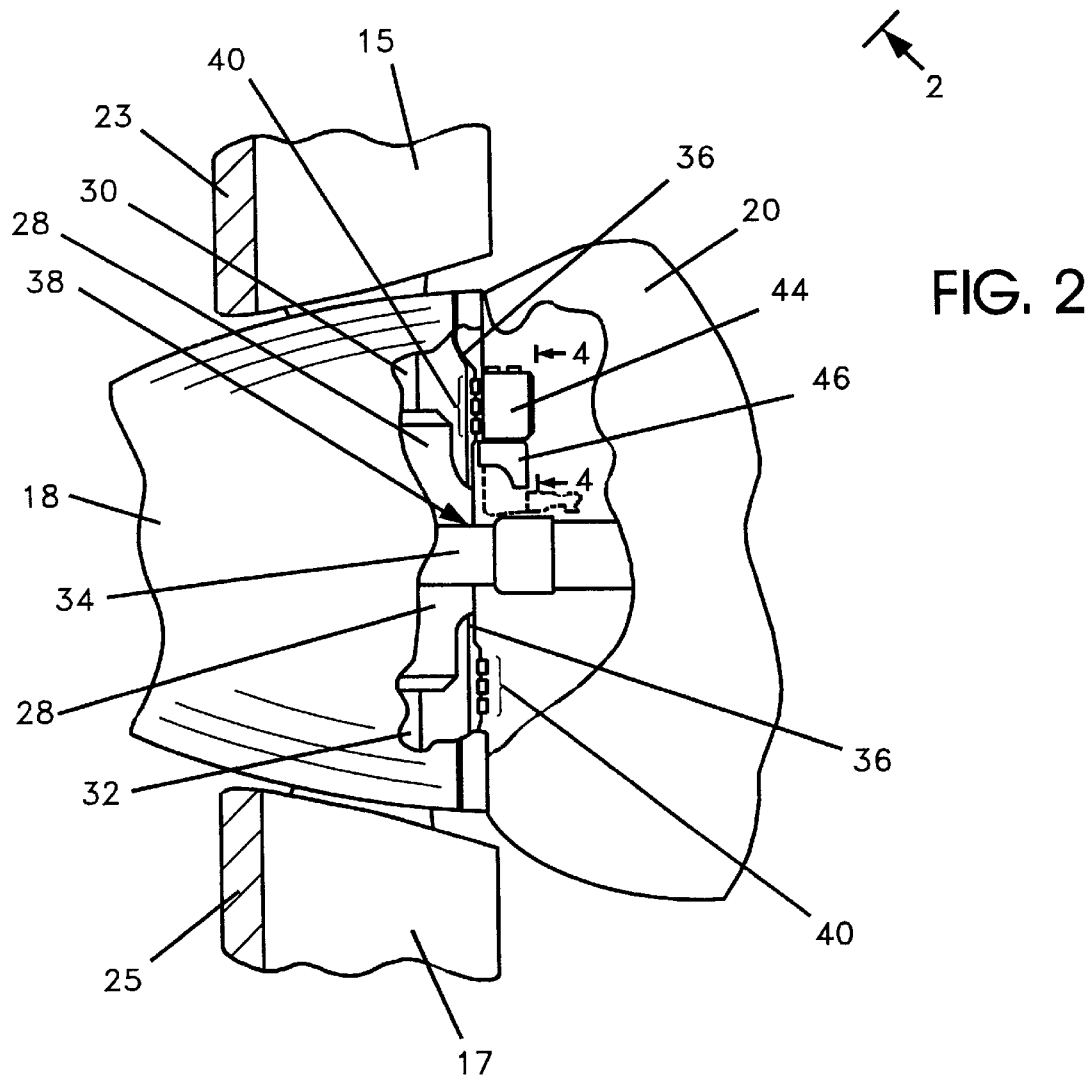
FIG. 2 is a partial section, with partial reveal, of one portion of the assembly of FIG. 1.

Referring now to FIG. 2, in a simplified, partially revealed section taken along the line 2—2 of FIG. 1, the spinner 18 encloses a hub assembly 28 which mechanically secures the spars of the propeller blades 14–17 to the engine shaft 34, as shown for the spars 30, 32 of the blades 15, 17. The rearward interior portion of the spinner, that facing the engine cowling 20, includes a bulk head 36 which is fastened along the interior periphery of the spinner and the aft surface of the hub. The bulk head 36 is both substantially flat and substantially annular in its geometry, and includes a center hole 38 through which the engine shaft 34 connects to the hub assembly 28.

The exposed surface of the bulk head includes a substantially annular portion formation of electrically insulated material having disposed therein one or more concentric, annular slip rings 40. Typically the bulkhead comprises a molded plastic composition having pre-molded grooves adapted to receive the slip rings, which are bonded into the grooves with an epoxy adhesive or resin. The slip rings, which are preferably copper, each include an electrical contact, which may comprise a bolt, that is attached, as by soldering, to the underside surface of the slip ring. The contact projects through the bulkhead to the side opposite the slip rings, i.e. the side toward the propeller, and provides a junction to which the heaters may be connected through electrically conductive wires. Electrical current is provided to the slip rings through carbon-brushes (not visible in FIG. 2) mounted within a brush block housing assembly 44, which is mounted by bracket assembly 46 and bolts 48 to the non-rotating side of the propulsion system.

Figure 3:
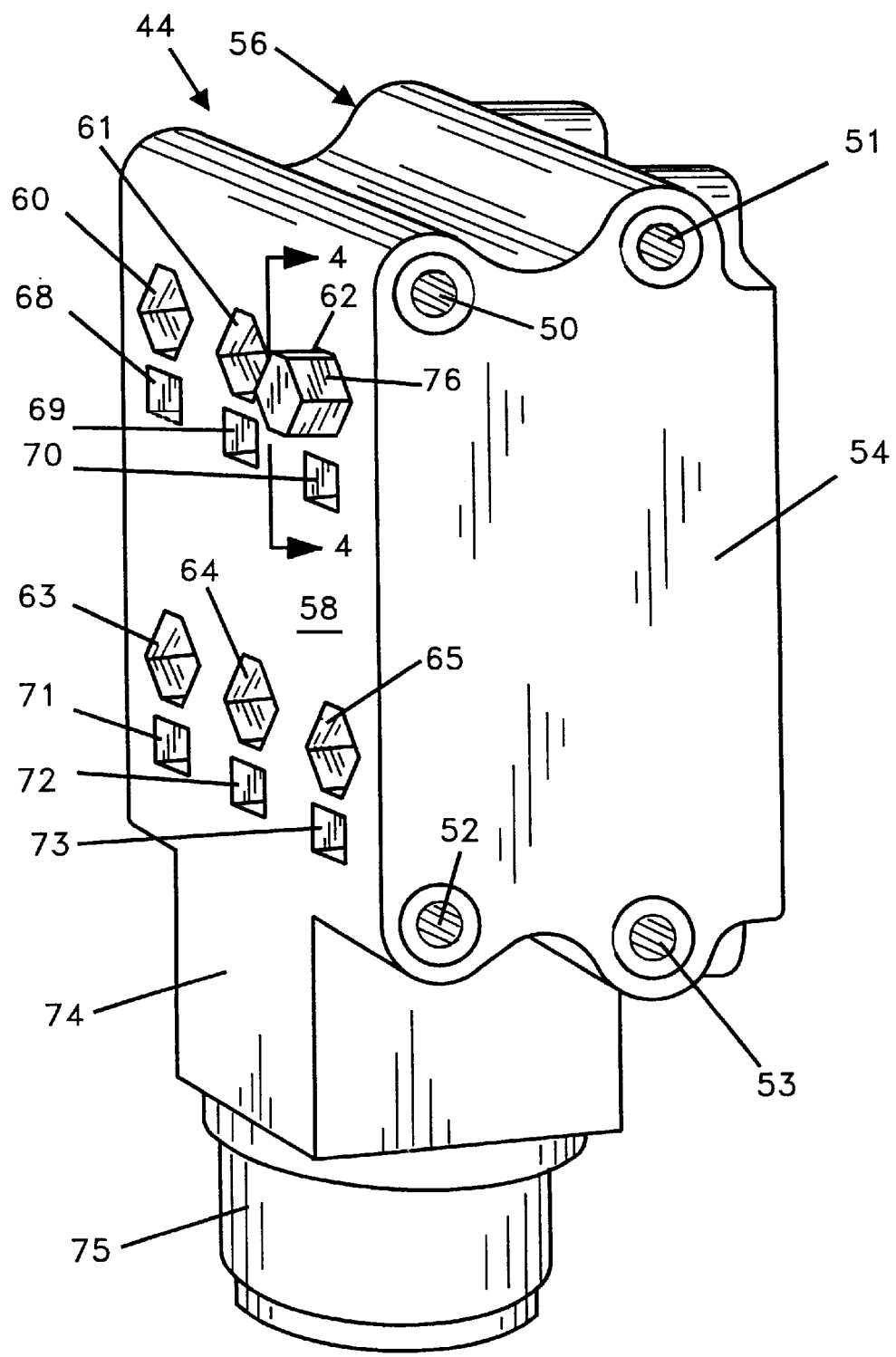
FIG. 3 is a perspective illustration of one view of the brush block assembly of the present invention.
Figure 5:
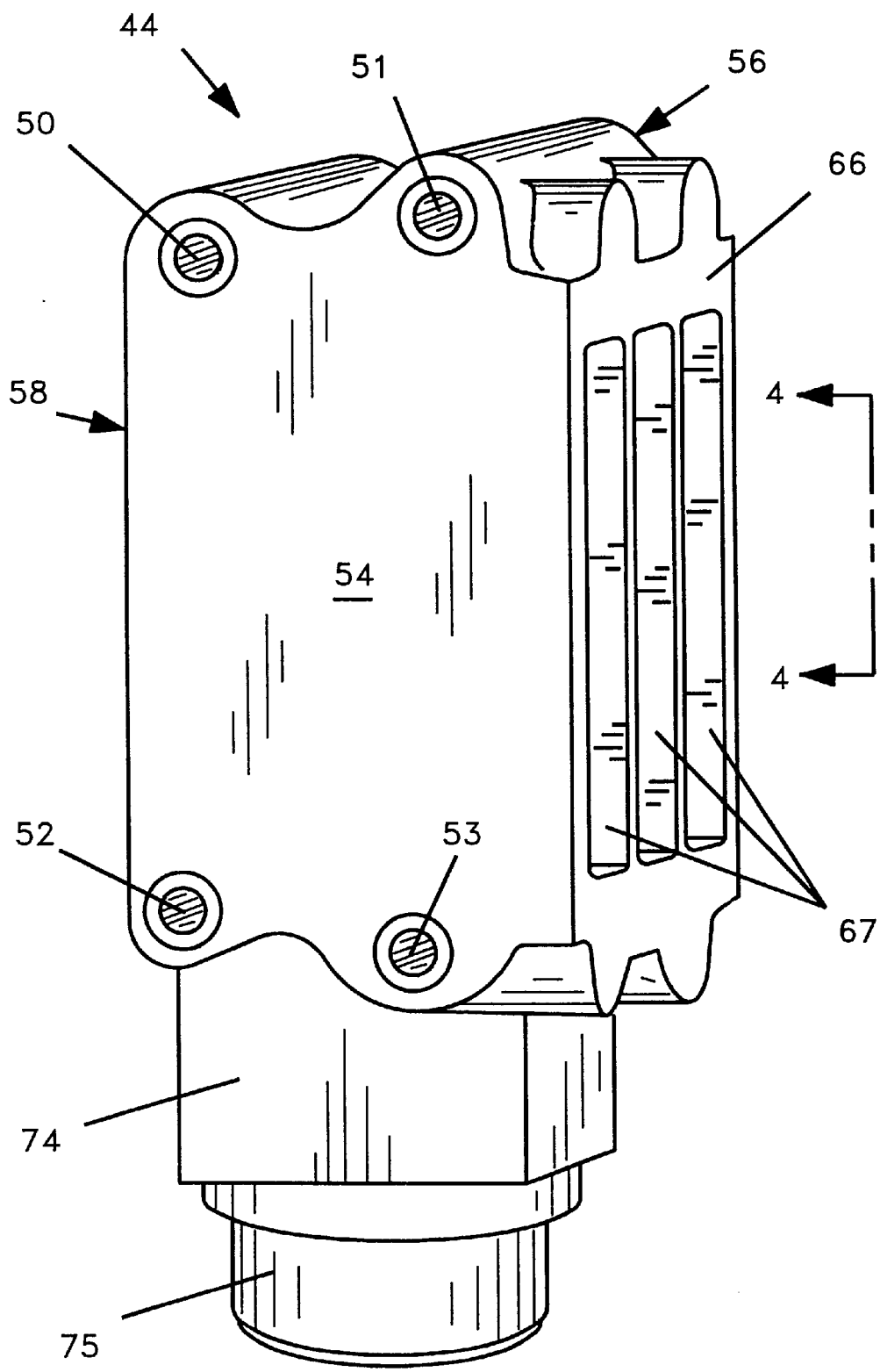
FIG. 5 is a perspective illustration of a second view of the brush block housing of the present invention.

Referring now to FIGS. 3 and 5, which are alternate view, perspective illustrations of the brush block housing 44. The assembly 44 is a one piece molded assembly comprising a thermoplastic molding compound material having an organic polytetrafluoroethylene (PTFE) filler distributed within a polyetheretherketone (PEEK) thermoplastic resin. The PTFE filler is contained within the PEEK thermoplastic resin at a level of from 5% to 50% by weight. The preferred range of density of the PTFE filler is from 15% to 40% by weight, and suitable compounds include XP-93 (30% PTFE filled PEEK) produced by Ensinger Special Polymers, Inc. and LL-4040 compound(20% PTFE filled PEEK) produced by LNP Engineering Plastics, Inc.

The shape geometry of the housing is determined by the particular engine and/or aircraft model type, so as to provide secure mounting of the assembly and brushes on the non-rotating side of the propulsion system. The housing is formed by injection molding, which allows accurate control of the molded housing's dimensions and shape. The injection molding process selected, and the equipment used to perform the process, may be any of those known processes and equipment deemed suitable by those skilled in the art to mold the organic polytetrafluoroethylene (PTFE) and polyetheretherketone (PEEK) thermoplastic resin compound into a brush block housing having the shape geometry required for the particular application.

Generally, the molding compound is heated to make it flowable and when molten it is injected under pressure in the range of 10,000 to 30,000 psi into a metal mold, or die having the desired features of the housing. The actual pressure is determined by the fluidity of the material. The molten material is held under pressure until the PTFE/PEEK mass has hardened sufficiently to be removed from the mold without distortion. During this hardening time the mold temperature must be maintained below the softening point of the material so as to allow hardening, but it must be high enough to prevent shrinkage of the molded compound housing due to hardening of the outside skin too quickly.

FIGS. 3 and 5 illustrate generally the shape of the present molded brush block housing 44. The housing includes mounting holes 50–53 which, in the present embodiment, pass through the housing from a first side surface 54 to an opposite side surface 56, in a direction transverse to the housing's interface surface 58. The mounting holes 50–53 allow bolts or other suitable fasteners to be used to secure the first surface 54 to a mating surface of the bracket 46 (FIG. 2) in a manner which places the interface surface 58 in spatial proximity to the slip rings 40 (FIG. 2).

The housing includes a plurality of brush pockets, or brush chambers, 60–65 which are arrayed in a two row, three column matrix. formed through the main housing. As shown in further detail in FIG. 4, each of the pockets extend through the housing from the interface 58 to a terminal surface 65 which is set back from the connection surface 66 (FIG. 5)of the housing by a plurality of connection recesses 67. Each column of keyways is terminated at the terminal surface 65 which is in the bottom, or valley of an associated one of a plurality of connection recesses 67. The recesses 67 provide a protective enclosure for electrical connections associated with each keyway through the housing body to a connection surface 66 (FIG. 5).

Figure 4:
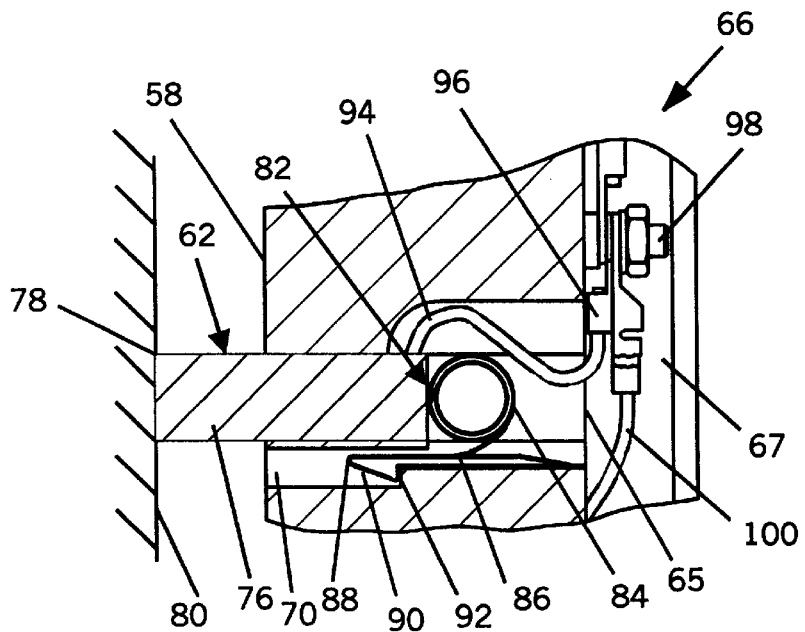
FIG. 4 is a sectioned view of one portion of the assembly of FIG. 3.

Each of the brush pockets 60–65 have an associated access slot 68–73 which facilitate the installation and removal of individual springs which, as described more fully in FIG. 4, bias each brush with a spring load to maintain the contact end of the brush against the associated slip ring surface. The housing further includes a pedestal portion 74 which houses an electrical connector 75. The connector provides the input/output signal interface between the housing 44 and the associated on-board equipment, including the power source.

In the present embodiment, the brush pockets 60–65 each have a hexagonal cross section which is adapted to receive, in a slidably engaging manner, a corresponding hexagonal shaped brush, as shown in FIG. 3 by the brush 76. To facilitate the illustration and description of the housing's features only one brush is shown installed. However, as understood, in the installation and operation of the housing in the deicing there are brushes installed in each of the pockets 60–65. The brushes used in the present embodiment are of a known type, comprising a copper-graphite composition, and they are available in various body style geometry. A commonly used configuration is the illustrated hexagonal cross section in which the hex flat portions are approximately 0.5 inches wide and the overall brush length is approximately one inch. It should be understood, however, that the brush material composition and the brush body geometry is selectable for a given deicing system application, and that the brush pocket cross sectional geometry would necessarily conform to the selected shape brush.

FIG. 4 is a sectioned view of a portion of the housing 44 taken along the line 4—4 of FIG. 3, which includes the brush pocket 62 and brush 76. The brush pocket is formed through the housing from the interface surface 58 to the connection surface 66. The brush 76 is mounted in the pocket and the body of the brush extends substantially midway into the pocket from the interface 58. The inserted portion of the brush body is, therefore, entirely enclosed within the pocket and not the keyway, ensuring that the body surface is only in contact with the PTFE filled PEEK material so as to minimize abrasion. With the housing installed on the bracket 46 the interface surface 58 is displaced from the surface of the slip rings at the clearance distance necessary to prevent interference between the housing and the rotating slip rings; typically from 0.090 inches to 0.120 inches (approximately 0.229 cm to 0.305 cm). The contact end 78 of the brush 76 is held against the slip ring surface 80 by the force exerted against the body's distal end 82 by a spring 84. The spring is nested within the pocket 62, in that portion of the pocket cavity closest to the connection surface 66. In the present embodiment the spring coil is held in contact with the distal end 82 by a spring base portion 86 having a locking portion 88 extending into the access slot 70. An integral finger portion 90 is displaced at an angle of from 100 to 170 degrees from the base 86 and engages a detent 92 within the recess 70, thereby fixing the coil 84 in position within the pocket 62.

The distal end 82 of the brush 76 is mechanically and electrically connected to an electrical conductor 94 which in the best mode embodiment is fitted at the opposite end with a clip 96 adapted to engage an associated one of a plurality of mountings 98, which are disposed within the one of the column recesses 67 (FIG. 5) associated with the pocket 62. There is one mounting 98 for each of the two keyways associated with the pair of brushes in contact with a common slip ring. In the present embodiment the associated keyways are 60,63 and 61,64 and 62,65. The mountings, one for each of the pockets 60–65, is of a known type which mechanically captures and electrically connects the brush conductors, such as the conductor 94, with associated ones of a plurality of current signal conductors, such as the conductor 100. The plurality of current signal conductors, such as the conductor 100, are routed through the housing 44 to provide electrical current from the connector 75 to the mountings, such as the mounting 98, associated with each of the pockets 60–65.

Deicing must occur symmetrically to prevent imbalance in the blade assembly which means either deicing all the blades simultaneously or intermittently deicing groups of opposing blades simultaneously. However, aircraft power supplies are heavy so that it is desirable to minimize the total propeller power requirements. For a 6 bladed propeller it may be more practical from a power requirement viewpoint to de-ice three groups of two blades simultaneously at a 33% duty cycle than two groups of three blades at a 50% duty cycle. Therefore, in the present embodiment for a four bladed assembly 12 the heaters for opposing blades are electrically connected in pairs. Depending on the rated output of the aircraft's power source, this allows for either the simultaneous energizing of all heaters or the intermittent energizing of alternate pairs of heaters in a substantially 50% duty cycle.

Similarly, it is desirable to minimize the current density of the contact end surfaces of the brushes to extend their replacement cycle time. Current density is expressed in amperes/square inch, and the square inch area refers to the total contact area between the brush and the slip ring. By having two brushes supply each slip ring the current load is substantially divided between the brushes, lowering the current density for each brush in the pair and extending the operating life of the brush contact surface. In addition, the redundancy of having two brushes associated with each slip ring provides greater system reliability in that if one brush fails the second brush can carry the load.

Figure 7:
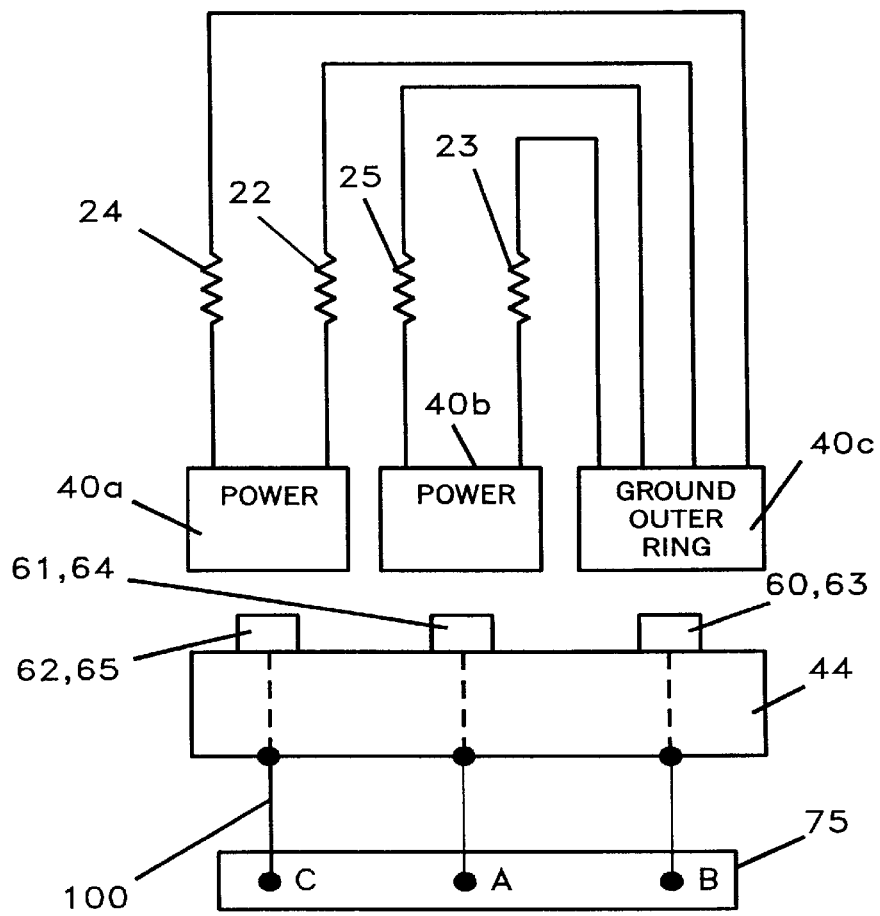
FIG. 7 is a functional schematic diagram which is associated with the illustration of FIG. 6.

Therefore, in the present system embodiment there are two brushes in contact with each slip ring and each slip ring is electrically connected to two heaters. Referring now to FIGS. 6 and 7. FIG. 6 figuratively depicts the installed housing 44 as a transparency to illustrate the registration of the pocket 60–65 with the slip rings 40(*a*)–40(*c*), and FIG. 7 is a simplified schematic illustration of the deicing system for the four bladed propeller system 12. The reference numerals in FIGS. 6 and 7 correspond, where applicable, to the system elements which they represent. The brush pairs associated with the pockets 62, 65 are in register with slip ring 40(*a*), which is electrically connected to heaters 22, 24 of opposing blades 14, 16 (FIG. 1). The brushes associated with pockets 61, 64 are in register with slip ring 40(*b*), which is electrically connected to heaters 23, 25 of opposing blades 15, 17. The low potential side of each of the heaters 22–25 is electrically connected to slip ring 40(*c*) which is in register with the brushes associated with pockets 60, 63, are in register with slip ring 40(*c*).

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. A brush block assembly for use in a propeller deicing system to provide electrical current from an electrical source, through slip rings disposed on a rotational interface of the deicing system, to heater elements mounted on the propeller blades, the assembly comprising:

a housing, having a plurality of brush pockets arrayed along an interface surface thereof in a manner to provide, with operational installation of the housing in the deicing system, proximate registration of one or more of said brush pockets with each slip ring disposed on the rotational interface, said housing including an electrical connector for providing electrical current from the source to each said brush pocket, each said brush pocket being adapted to receive in releasable engagement an electrically conductive brush in a manner which, with operational installation of the housing in the deicing system, places a contact end of each electrically conductive brush in physical contact with the pocket registered slip ring and which electrically connects the distal end of each brush to said electrical connector; and a plurality of electrically conductive brushes, one for each said brush pocket, each said electrically conductive brush having a contact end adapted to be placed in contact with the rotatable surface of a slip ring and a distal end adapted to receive an electrical current signal;

as characterized by:

said housing being formed from a thermoplastic material comprising an organic polytetrafluoroethylene (PTFE) filler distributed within a polyetheretherketone (PEEK) thermoplastic resin.

2. The apparatus of claim 1 wherein said brush block assembly thermoplastic molding compound contains PTFE at a level of from substantially 5% to substantially 50% by weight.

3. The apparatus of claim 1 wherein said brush block assembly thermoplastic molding compound contains PTFE at a level of from substantially 15% to substantially 40% by weight.

4. The apparatus of claim 3 wherein said brush block assembly thermoplastic molding comprises 20% PTFE filled PEEK.

5. The apparatus of claim 3 wherein said brush block assembly thermoplastic molding comprises 30% PTFE filled PEEK.

6. Apparatus for deicing the surface of propeller blades disposed in a spinner assembly mounted to and rotatable with the shaft of an engine installed on an aircraft, the aircraft having an electrical power source and having operator selectable actuation of the apparatus, comprising:

rotational interface means, adapted to be fixedly mounted to and rotatable with the spinner assembly, and including one or more substantially annular slip rings disposed on an interface surface thereof;

heater elements, at least one disposed on each propeller blade and each electrically connected to an associated one of said slip rings;

brush block housing, having a plurality of brush pockets, each adapted to receive therein one of a like plurality of electrically conductive brushes of the type having a contact end adapted to be placed in contact with the rotatable surface of a slip ring and a distal end adapted to receive an electrical current signal, said housing having an electrical connector for receiving electrical power from the aircraft power source, and each said brush pocket including means for electrically connecting said distal end of an installed brush to said electrical connector, said housing further being adapted for mounting in a manner which places said contact end of each said installed brush in stationary registration with a location along the path trajectory of said slip rings;

as characterized by:

said brush block housing being injection molded from a thermoplastic molding compound comprising an organic polytetrafluoroethylene (PTFE) filler distributed within a polyetheretherketone (PEEK) thermoplastic resin.

7. The apparatus of claim 6 wherein said housing thermoplastic molding compound contains PTFE at a level of from substantially 5% to substantially 50% by weight.

8. The apparatus of claim 6 wherein said housing thermoplastic. molding compound contains PTFE at a level of from substantially 15% to substantially 40% by weight.

9. The apparatus of claim 8 wherein said housing thermoplastic molding comprises 20% PTFE filled PEEK.

10. The apparatus of claim 8 wherein said housing thermoplastic molding comprises 30% PTFE filled PEEK.

* * * * *